United States Patent
Domazakis

(10) Patent No.: US 8,101,228 B2
(45) Date of Patent: *Jan. 24, 2012

(54) PREPARATION METHOD FOR MEAT BASED PRODUCTS, WITH DIRECT INCORPORATION OF OLIVE OIL AND ADDITION OF FETA TYPE CHEESE

(75) Inventor: Emmanouil Domazakis, Rethymnon (GR)

(73) Assignee: Creta Farm Societe Anonyme Industrial and Commercial, Rethymnon (GR)

( * ) Notice: Subject to any disclaimer, the term of this patent is extended or adjusted under 35 U.S.C. 154(b) by 763 days.

This patent is subject to a terminal disclaimer.

(21) Appl. No.: 10/506,411

(22) PCT Filed: Oct. 14, 2003

(86) PCT No.: PCT/GR03/00046
§ 371 (c)(1),
(2), (4) Date: Sep. 1, 2004

(87) PCT Pub. No.: WO2004/082403
PCT Pub. Date: Sep. 30, 2004

(65) Prior Publication Data
US 2005/0181111 A1    Aug. 18, 2005

(30) Foreign Application Priority Data
Mar. 17, 2003 (GR) .............................. 20030100131

(51) Int. Cl.
*A23L 1/317* (2006.01)
(52) U.S. Cl. ........................................ 426/646; 426/513
(58) Field of Classification Search .................. 426/412, 426/646, 513, 516, 804
See application file for complete search history.

(56) References Cited

U.S. PATENT DOCUMENTS

| 3,309,204 A | * | 3/1967 | Helmer et al. | 426/646 |
| 3,515,561 A | * | 6/1970 | Bauer et al. | 426/265 |
| 5,238,701 A |  | 8/1993 | Dubanchet | |
| 5,368,878 A | * | 11/1994 | Smick et al. | 426/646 |
| 5,654,028 A | * | 8/1997 | Christensen et al. | 426/574 |
| 5,766,657 A | * | 6/1998 | Farkye et al. | 426/39 |
| 5,948,462 A | * | 9/1999 | Atsuta et al. | 426/583 |
| 6,419,977 B1 | * | 7/2002 | Born | 426/646 |
| 2003/0049364 A1 |  | 3/2003 | Domazakis | |

FOREIGN PATENT DOCUMENTS

| DE | 10065633 A | * | 8/2001 |
| EP | 505797 B1 | * | 11/1994 |
| EP | 0779032 A | * | 6/1997 |
| GB | 1108994 A | * | 4/1968 |
| JP | 2003093021 A | * | 4/2003 |
| WO | WO 02/065860 A1 | * | 8/2002 |

OTHER PUBLICATIONS www.sonoma sausage.com, Jul. 28, 2003, p. 1 Date verified by web from www.archive.org, attached printout, p. 1.*
http://search.freefind.com/find.html?id=81296093&pageid=r&mode=ALL&n=0&query=feta, Soft cheeses, pp. 8.*
M.E. Aly, An attempt for producing low-sodium Feta-type cheese, Food Chemistry, 1995, pp. 295-299, vol. 52, Elsevier Science Limited, Great Britain.
E. Kondyli, M.C. Katsiari, T. Masouras, L.P. Voutsinas, Free fatty acids and volatile compounds of low-fat Feta-type cheese made with a commercial adjunct culture, Food Chemistry, 2002, pp. 199-205, vol. 79, Elsevier Science Ltd.

* cited by examiner

*Primary Examiner* — Jyoti Chawla
(74) *Attorney, Agent, or Firm* — Husch Blackwell LLP

(57) ABSTRACT

Preparation method for meat-based products with the direct incorporation of olive oil and the addition of the feta type cheese, which involves the following stages: (a) mixing of fat-free meat with water, salt, preservatives and auxiliary salts (b) addition of olive oil and mixing (c) addition of feta pieces and mixing (d). storage of the mixture with simultaneous vacuum application and pasteurization (e) deep-freezing of the product. The meat-based products with olive oil and feta prepared in line with the aforementioned method have exceptional solidness, as far as structure is concerned, and retain the physical-chemical characteristics of the olive oil and the organoleptic characteristics of the feta contained in the products. Using the aforementioned method, preparation of such products can be assured even without the incorporation of olive oil, with the addition of feta type cheese only.

4 Claims, No Drawings

PREPARATION METHOD FOR MEAT BASED PRODUCTS, WITH DIRECT INCORPORATION OF OLIVE OIL AND ADDITION OF FETA TYPE CHEESE

BACKGROUND OF THE INVENTION

The name "feta" is registered as a protected designation of origin (PDO) to indicate the salted white cheese traditionally produced in Greece and in particular made with milk originating exclusively from the regions of Macedonia, Thrace, Sterea Ellada (Central Greece), the Peloponnese and the prefecture of Lesbos. The milk used for the production of feta should be—sheep's milk or a mixture of sheep's milk and goats' milk. The milk's origin constitute a basic characteristic of the cheese produced, as it provides it with its organoleptic features—its flavour, aroma, colour and even structure and texture.

As far as their structure is concerned, cooked and smoked meat preparations constitute an "emulsion" with the following constituent components: milk proteins, water (from the meat and milk added) and added fat (fat tissue).

The solidness of the "emulsion" depends basically, inter alia, on the capacity of the meat to retain the water and homogenise the added fat.

More particularly, the muscle proteins and especially the salt-soluble ones (actin, myosin and actomyosin), which represent the largest part (around 60%) of the myofibrils, contribute to the solidness of the "emulsion", as well as to its succulence. They also act as a protective envelop of the incorporated fat, which constitutes the discontinuous phase of the emulsion and the primary destabilisation factor.

Many products on the international market, which have been accepted by the large majority of consumers, are based on the addition of milk products to meat-based products. Hard cheese (with a short or long maturity time) is primarily used for such products.

According to studies, it has been found that the fatty acid content differs in each kind of cheese and depends on the initial quality of the milk added, on the kind of milk (sheep's milk, cow's milk, goat's milk etc or the percentage of each kind that is added to the milk mixture), the maturation time and the preparation method. Moreover, it also depends on the geographical origin of the milk since local changes in the feedstuffs and in the type of animal diet followed affects the fatty acid content of the milk added to produce the cheese.

The flavour and the aroma, which characterise a certain kind of cheese, results from its maturity, that is the primary decomposition of lactose, fat and protein of the cheese and the secondary conversion of its products, through various fermentation procedures which they undergo during the maturation process of the cheese.

The distinctive flavour and the aroma of each kind of cheese does not result from a specific substance, but from a large number of substances, each one having different taste, but all together and relatively proportionately giving flavour to the cheese and in fact the final flavour which determines which kind of cheese it is. Moreover, from the fatty acids, it is acetic acid which gives an acidic flavour; and rancid butter and caproic, caprylic and capric acids which give a peppery flavour.

Feta is a semi-salted cheese with high acidity. Among the fatty acids contained in the product, acetic acid prevails, but when preparations made from 'the stomach of a sheep and a goat are included in the volatile enzymes used to coagulate the milk, then, fatty acids C6-C10 strongly contribute to the cheese's flavour, by adding a peppery flavour. Typical feta made with sheep's milk has high ethanol, propanol and butanol content.

The structure of the cheese is a dense mesh of protein fibres differently cross-linked. The fat globules and whey are included in that mesh, that is the humidity and the water-soluble components of the cheese. Over the course of time, during the maturation process of the cheese, many protein fibre links break, releasing calcium and forming soft monocalcium paracaseinate and paracaseinate. The cheese undergoes an internal conversion and obtains its final structure and texture that can be characterised as soft, friable, granular etc.

Every kind of cheese is characterised by the proportion of amino acids, sulphide compounds, acid esters and fatty acids, which result from the proteolysis of the protein mesh.

The uniqueness of feta type cheese products, which have been protected by the Council of the European Union, and which as a cheese has been accepted by a large majority of consumers as a tasty product rich in nutrients, was the reason why we conducted this study.

Nevertheless, the incorporation of oil, compared to the ordinary addition of pork fat, if attempted using classic techniques, gives rises to stability difficulties or the development of destabilizing tensions affecting not only the meat pulp emulsion, but also the final product, which displays the phenomenon of oil exudation.

There are also some established techniques of direct incorporation of vegetable fat, which include the procedure of preliminary heat treatment of oil at 100° C. two consecutive times.

Moreover, olive oil is a more particular case, as its role in human nutrition is discernible among seed oils and other vegetable oils and as it is also internationally acknowledged for the beneficial characteristics of its natural components (see Omega fatty acids and their protective role, low cholesterol levels, polyphenols and their role).

SUMMARY OF THE INVENTION

This invention concerns the preparation of meat-based products with the following main characteristics:
  The use or otherwise of olive oil, instead of the ordinary practice of adding animal fat (fat tissue)
  The use of fat-free, skeletal muscle (meat)
  The addition of special ancillary substances
  The addition of a 'feta' type cheese
  The application of appropriate technological procedures and mechanisms developed with a view to:
  Preparing a solid emulsion—meat pulp with a solid structure, capable of undergoing appropriate heat treatment, with the aim of incorporating and retaining the solid composition of olive oil and feta, after protein coagulation, in the emulsion's basic system which consists of muscle proteins, water and olive oil.
  Achieving the maximum possible conservation of the organoleptic, physical-chemical and nutritional characteristics of the differentiating factor, olive oil
  Achieving the maximum possible conservation of the physical-chemical organoleptic and nutritional characteristics of feta.

The solid incorporation of the fat (fat globules) and of the additional material (feta pieces) into the "emulsion" constitutes the technological aim of this invention, which is dealt with using well-known hyphenated techniques that favour the above and concern the adjustment of parameters, such as the special selection, and preparation of meat, the adjustment of the meat pulp pH, the amount of salt added, the use of ancillary substances, the addition of olive oil, the treatment-preparation conditions of the meat pulp, heat treatment, and refrigeration of the finished product etc.

It is thus considered appropriate that:

On one hand, olive oil, as an ingredient replacing the animal fat, should be added to cooked/smoked meat preparations, under particularly protective conditions, in order to ensure the maximum possible transfer of its properties to the product.

On the other hand, through the incorporation procedure of the olive oil and the addition of feta, the traditional technical production of cooked and smoked meats should be ensured, by regularly considering scientific data based on the properties of the proteins, fats, oil and feta and on the properties of the link between them.

It should also be borne in mind that the solidness of "meat emulsions" is strongly affected by:

The origin and composition of the fat to be incorporated
The physical-chemicals such as
  Profile of fatty acids (kind and degree of saturation)
  SFI (solid fat index)
  The relation between PUFA (polyunsaturated fatty acids), MUFA (monounsaturated fatty acids)/SUFA (saturated fatty acids) to the applicable temperatures at the various production stages.

It is obvious that technologically the differences between pork fat and olive oil should be considered seriously in the production of a solid emulsion.

Moreover, the following points should also be considered:

The particularity of feta, in order to conserve its initial structure, flavour, aroma and composition (humidity and salt content), when added to the meat pulp, during heat treatment, so as to conserve its nutritional components, its structure and its organoleptic characteristics.

The microbial growth of feta which is different from that of meat, in order to avoid possible development of pathogenic micro-organisms and the increase of the total mesophilic flora in the meat to non-acceptable levels, where the heat treatment is not effective enough to ensure a safe product.

At critical production temperatures (0-4° C. and up to 71° C.), blast freezing temperatures (after heat treatment) and the temperatures at which it is then stored (0-4° C.), its SFI plays an important role.

In the case of olive oil, its characteristics presuppose its incorporation under certain conditions, as follows:

The creation of the maximum possible incorporation of the oil through mechanical processes (mixing, homogenisation of the participating components)

The calculation of the ideal quantitative relationship between these components, in order to ensure the maximum possible absorption and conservation of the oil into the emulsion, as well as the maximum possible absorbance of additional water (relationship between fat and proteins, protein and water)

The creation of a solid, impermeable protein mesh around the fat globules, without applying high temperatures to denature the proteins, through mechanical processes and under selected conditions of vacuum application and temperature, during the mixing and homogenization—with the maximum possible dispersion and the maximum size of fat globules.

In the case of feta, its characteristics presuppose its addition under certain conditions, as follows:

The calculation of the ideal quantitative relationship between meat, water, olive oil and feta, in order firstly to ensure its acceptance by consumers and secondly to create a solid protein mesh between the meat pulp and the feta pieces, capable of preventing feta seeping out after heat treatment, refrigeration and the cutting of the product into slices. According to the study conducted, the incorporation of olive oil can vary between 5% and 15% and the addition of feta between 5% and 20% of the final product.

The creation of appropriate physical-chemical conditions (pH, water activity, salt content etc) applied to the product, in combination with the application of appropriate temperatures, during the stages of production, heat treatment, refrigeration (after heat treatment) and preservation, in order to prevent the development of undesired microorganisms (due to different microbial flora of the two products, meat and feta).

The creation of a solid protein mesh of meat and feta, capable, after the heat treatment and the application of mechanical processes—under selected conditions of vacuum application and temperature, during mixing, homogenisation, heat treatment and refrigeration, of maintaining the initial structure and texture of feta to the maximum degree, which is due to it being composed of dicalcium paracaseinate, monocalcium paracaseinate and paracaseinate, as well as its flavour resulting mainly from its fatty acid content.

This invention aims at the production of meat-based products:

By incorporating olive oil or otherwise, directly and at low temperature and by replacing the maximum possible quantity of animal fat
By adding pieces of feta type cheese
By adding combined ancillary substances, and
By applying special technological processes This has been achieved by mixing fat-free meat at low temperature with olive oil, in combination with the use of emulsifying additives, water, olive oil and the addition of feta covered with an appropriate protein mesh.

Moreover, the solidness of the feta added to the aforementioned products is achieved by the combined use of heat treatment (time, temperature) and the size of the product. The heat transfer rate, during the heat treatment to pasteurise the product, should be such that it will preserve the space lattice of the feta added.

Thus, this invention concerns cooked/smoked meat preparations with olive oil and feta and one production method, the mixing of olive oil, fat-free meat, water and feta at low temperature.

A method for preparing meat-based products, which is characterized by the incorporation of olive oil instead of animal fat, and the addition of feta cheese, comprising the following steps: (a) mixing fat-free meat at a temperature of 0° C. with $H_2O$ at a temperature of 2° C., salt, preservatives and auxiliary salts; (b) adding olive oil; (c) continuing mixing with simultaneous vacuum application for 3 minutes until the resulting product temperature rises up to 4° C.; (d) adding feta cheese and continuing vacuum mixing until the feta cheese is totally dispersed throughout the resulting product; (e) conveying the resulting product to a filling machine, where it is stored, with a simultaneous vacuum application at 1000 mbar and then pasteurization at 71° C. with total heat treatment time during pasteurization depending upon the diameter of the resulting product and varying between 1 and 3 hours; and (f) moving the resulting product into a freezer unit at a maximum temperature of 2° C.; wherein the quantity of olive oil added varies between 2 and 20% of the resulting product; and wherein the quantity of feta cheese added varies between 2 and 25% of the resulting product.

Meat-based products characterized by the addition of olive oil and feta cheese and prepared by the foregoing method.

A method for preparing meat-based products, which is characterized by the addition of feta cheese, comprising the following steps: (a) mixing fat-free meat at a temperature of 0° C. with H2O at a temperature of 2° C., salt, preservatives and auxiliary salts; (b) continuing mixing with simultaneous vacuum application for 3 minutes until the resulting product temperature rises up to 4° C.; (c) adding feta cheese and continuing vacuum mixing until the feta cheese is totally dispersed throughout the resulting product; (d) conveying the resulting product to a filling machine, where it is stored, with a simultaneous vacuum application at 1000 mbar and then pasteurization at 71° C. with total heat treatment time during pasteurization depending upon the diameter of the resulting product and varying between 1 and 3 hours; and moving the resulting product into a freezer until at a maximum temperature of 2° C.

Meat-based products characterized by the addition of feta cheese and prepared by the foregoing method.

DETAILED DESCRIPTION OF A PREFERRED EMBODIMENT

Finely chopped, fat-free meat at a temperature of 0° C. is mixed with water at 2° C. in a mixing machine, while at the same time, salt is added. Then, preservatives, auxiliary salts (i.e. salt, nitrates, citrate salt), sugars, water and seasonings (i.e. oregano, pepper, paprika, tomato, mint) are added. When the temperature of the mixture rises up to 2° C., olive oil is added. Mixing continues with the simultaneous vacuum application of 960 mBAR for 3 min, which firstly aims at freeing the oxygen captured in the mixture, in order to prevent oxidation and secondly at achieving the solidness of the emulsion (olive, water, meat), until the temperature of the mixture rises up to 4° C. Then follows the addition of feta cut into cubes of 1×1 cm. Vacuum mixing continues until the feta is totally dispersed throughout the meat pulp. The total mixing time is 15 min and the absorbed power 26 KW. The mixture is conveyed to the filling machine, where it is stored, with simultaneous vacuum application of 1000 mBAR and absorbed power 7 KW. Then, it is pasteurised at 71° C. The total heat treatment time and the heat transfer rate vary between 1 and 3 hours, so as not to affect the structure of the feta. After pasteurisation, the product is deep-frozen in a blast refrigeration unit at a temperature varying between −2° C. and 2° C., in order to successfully achieve the thermal shock required for product safety.

The aforementioned production method can be applied even without the addition of olive oil, but retaining the other parameters and producing meat-based products with feta.

Smoked/cooked meat preparations with feta and olive oil produced based on this invention have an exceptional solidness (cohesion) as far as their structure is concerned, due to the use of fat-free meat, the application of low temperatures and its vacuum preparation. The physical-chemical characteristics of the olive oil and feta contained in the products remain unaltered, due to the low temperatures applied during the production procedure.

The invention claimed is:

1. A method for preparing meat-based products, with the direct incorporation of olive oil instead of animal fat and with the addition of Feta cheese pieces in a manner that preserves the characteristics of the Feta cheese pieces, comprising the following steps:
   (a) Preparing a solid fat-free meat emulsion from raw fat-free meat pulp at a temperature of 0° C., H2O at a temperature of 2° C., salt, preservatives and auxiliary salts; wherein the auxiliary salts are a citrate salt, nitrates, salt, and mixtures thereof; and mixing the emulsion constituents until the temperature of the emulsion rises up to 2° C.;
   (b) Adding olive oil to the emulsion; Continuing mixing of the emulsion under a simultaneous vacuum until the temperature of the emulsion rises up to 4° C., wherein the olive oil is substantially incorporated into the emulsion;
   (c) Adding Feta cheese pieces to the emulsion;
   (d) Mixing the Feta cheese pieces until the Feta cheese pieces are substantially incorporated in the meat pulp and continuing the vacuum mixing until the Feta cheese pieces are dispersed throughout the meat pulp;
   (e) Conveying the emulsion to a filling machine, where it is stored, under vacuum and is pasteurized at 71° C.; and
   (f) Moving the emulsion into a blast freezer unit having a temperature of −2° C. to 2° C.

2. The method of claim 1, wherein the quantity of olive oil added varies between 2 and 20% by weight of the emulsion.

3. The method of claim 1, wherein the quantity of Feta cheese pieces added varies between 2 and 25% by weight of the emulsion.

4. A method for preparing meat-based products, with the direct incorporation of Feta cheese pieces comprising the following steps:
   (a) Preparing a solid fat-free meat emulsion from raw fat-free meat pulp at a temperature of 0° C., H2O at a temperature of 2° C., salt, preservatives and auxiliary salts; wherein the auxiliary salts are a citrate salt, nitrates, salt, and mixtures thereof; and mixing the emulsion constituents until the temperature of the emulsion rises up to 2° C.;
   (b) Continuing mixing of the emulsion under a simultaneous vacuum until the temperature of the emulsion rises up to 4° C.;
   (c) Adding Feta cheese pieces to the resulting emulsion and continuing the vacuum mixing until the Feta cheese pieces are dispensed throughout the emulsion, whereby the Feta cheese pieces are incorporated in the emulsion;
   (d) Conveying the emulsion to a filling machine, where it is stored, under vacuum and is pasteurized at 71° C.; and
   (e) Moving the emulsion into a blast freezer unit having a temperature of −2° C. to 2° C.

* * * * *